Figure 1:
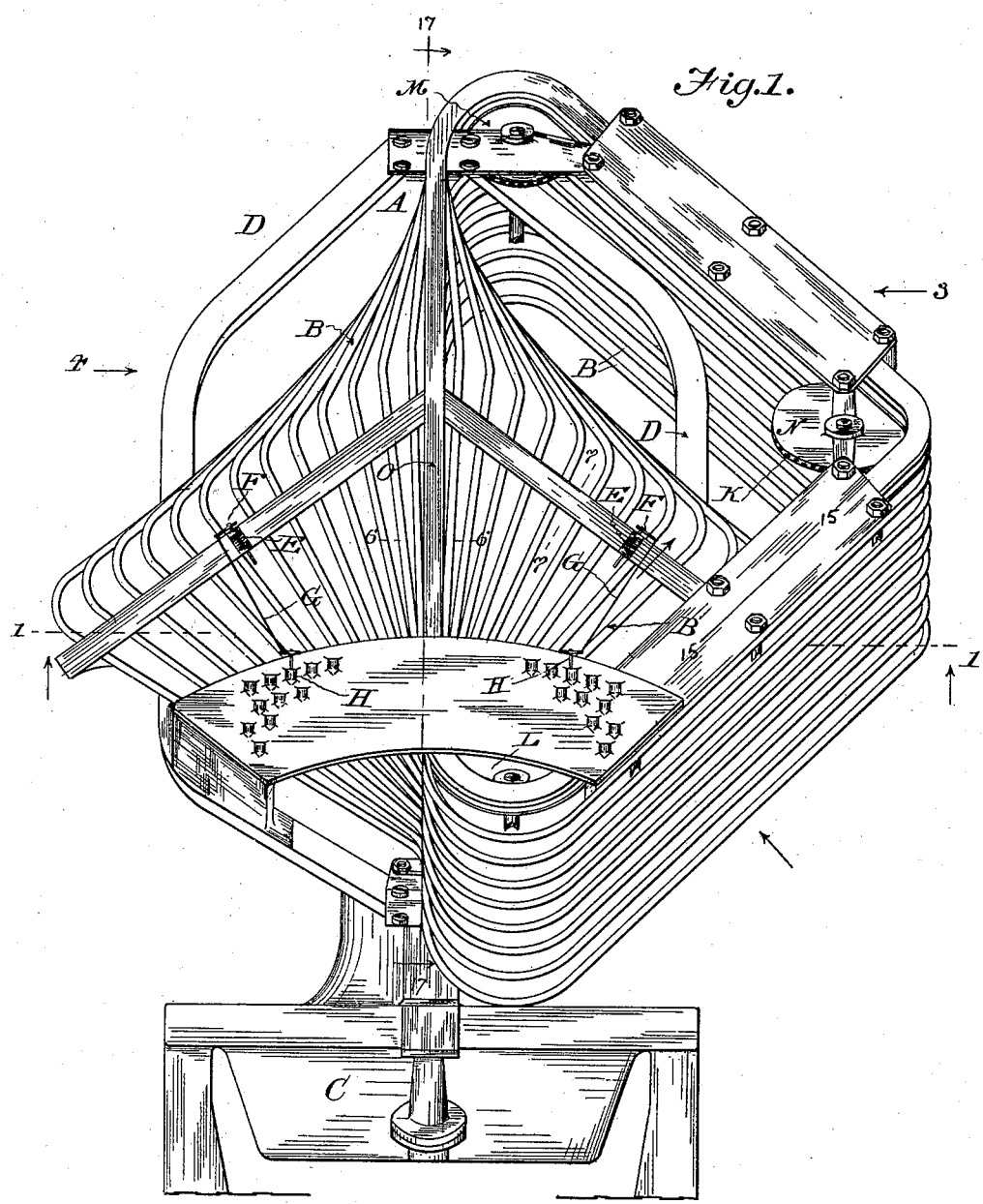

No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 1.

WITNESSES:
J. F. George
W. H. Gruler

INVENTOR
Jno. R. Rogers
BY
ATTORNEY

No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 2.

WITNESSES:
J. F. George
W. H. Gruler

INVENTOR
Jno R. Rogers
BY
R. G. Dodge
ATTORNEY

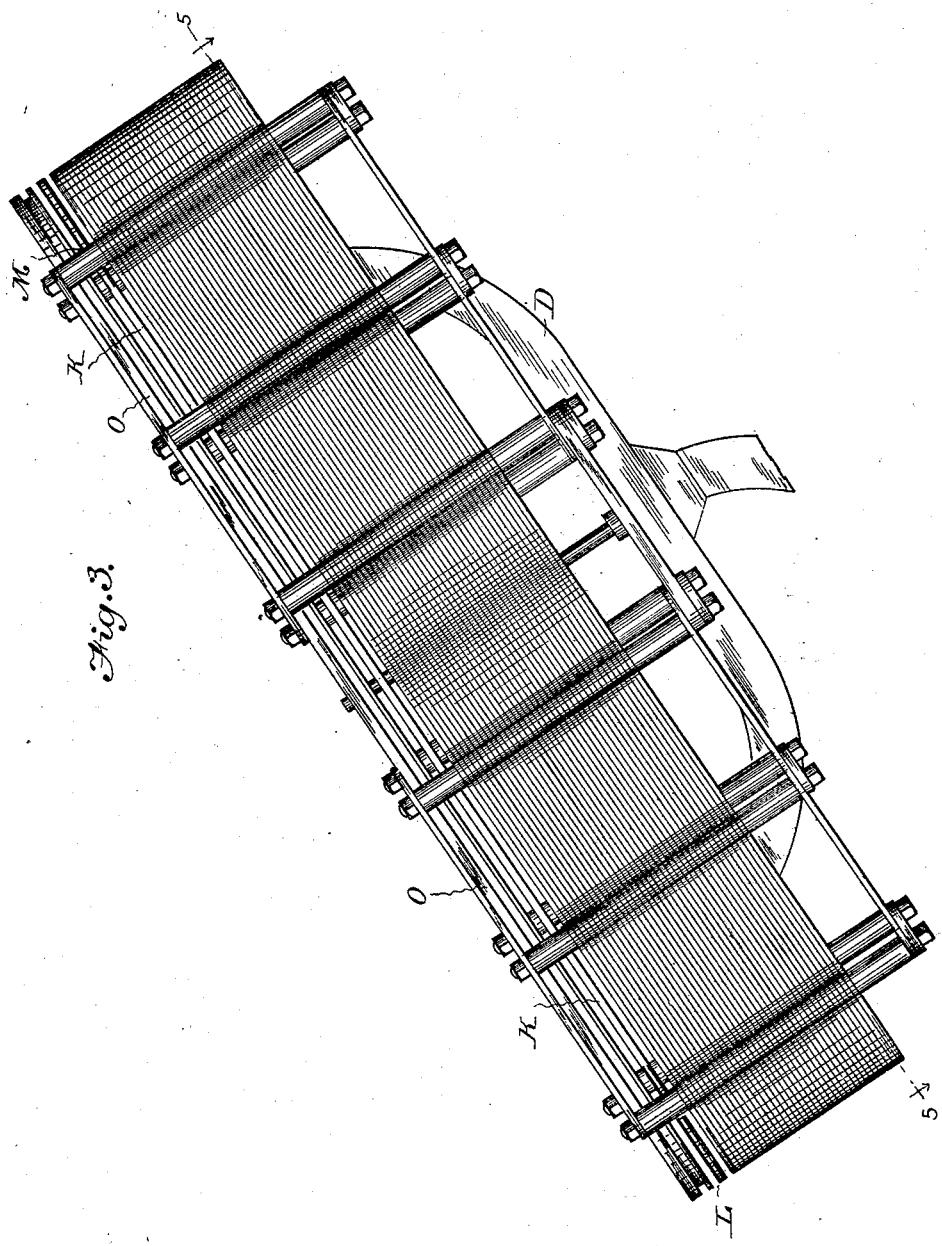

No. 630,412. Patented Aug. 8, 1899.
J. R. ROGERS.
MECHANISM FOR ASSEMBLING AND DISTRIBUTING TYPE DIES.
(Application filed Mar. 28, 1899.)
(No Model.) 10 Sheets—Sheet 4.
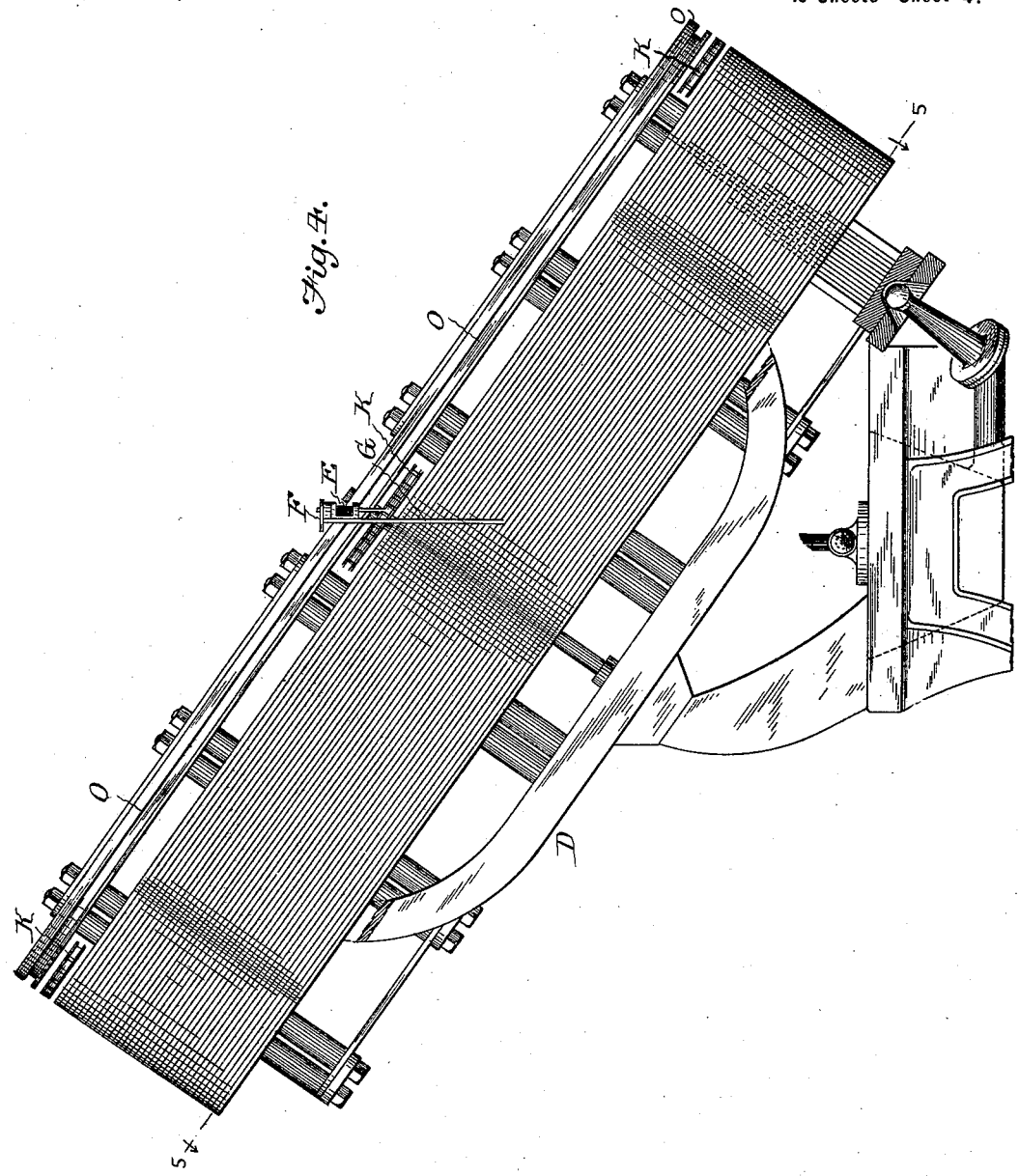
WITNESSES:
J. F. George,
W. H. Gruler.
INVENTOR
Jno. R. Rogers
BY
P. F. Dodge
ATTORNEY

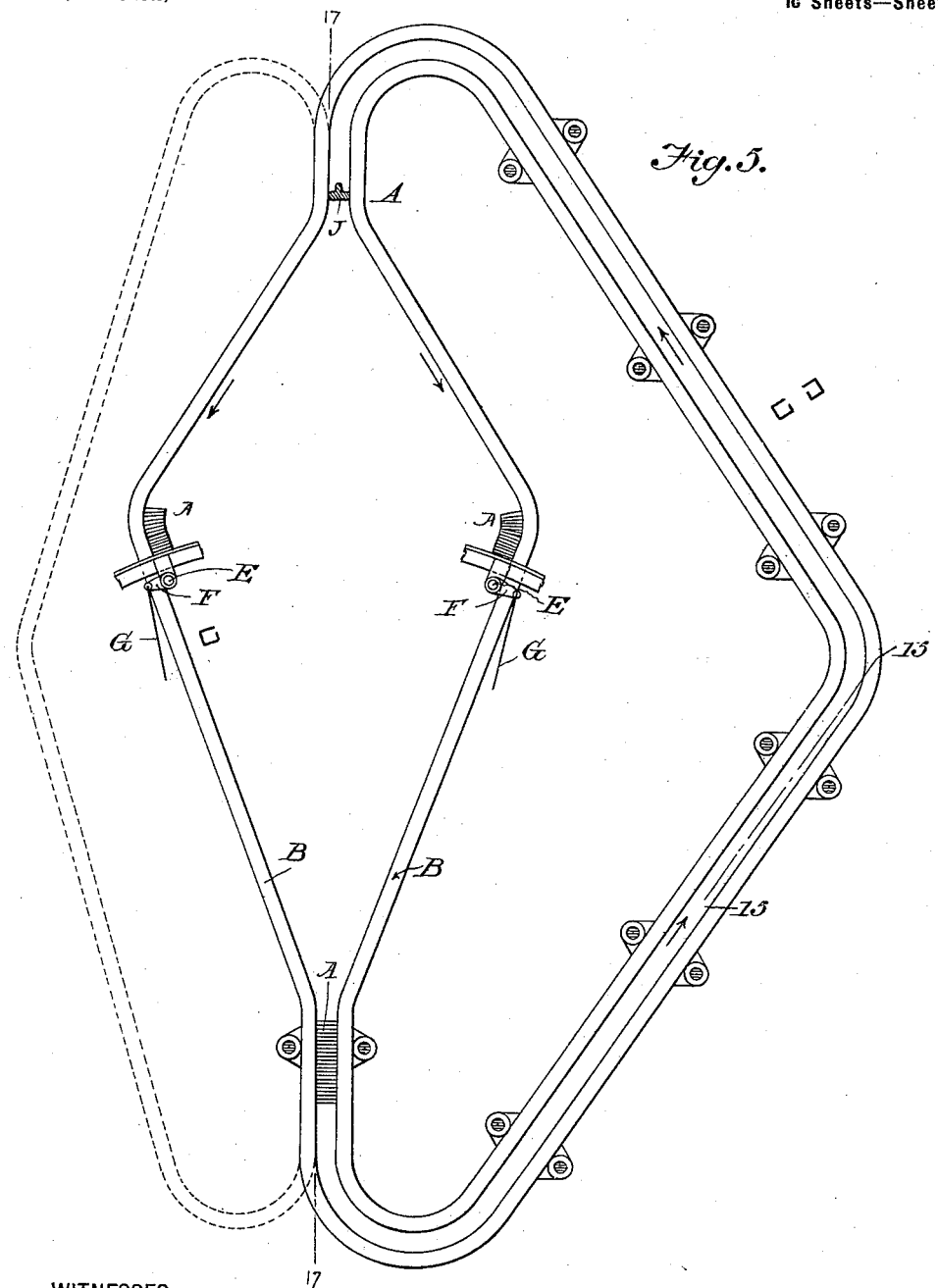

No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 6.
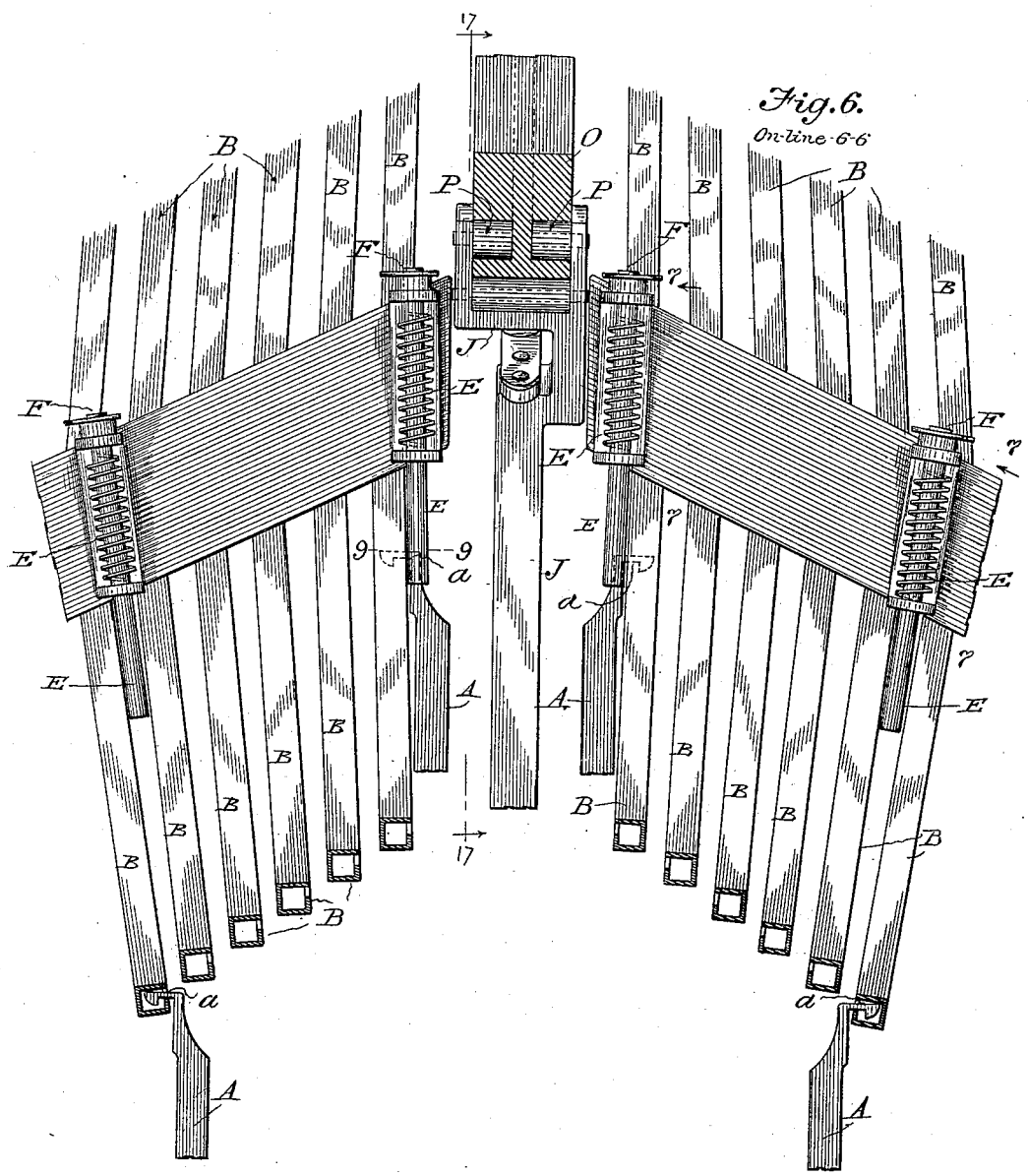
WITNESSES:
J. F. George.
W. H. Gruler.
INVENTOR
Jno. R. Rogers
BY
P. F. Dodge
ATTORNEY No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 7.
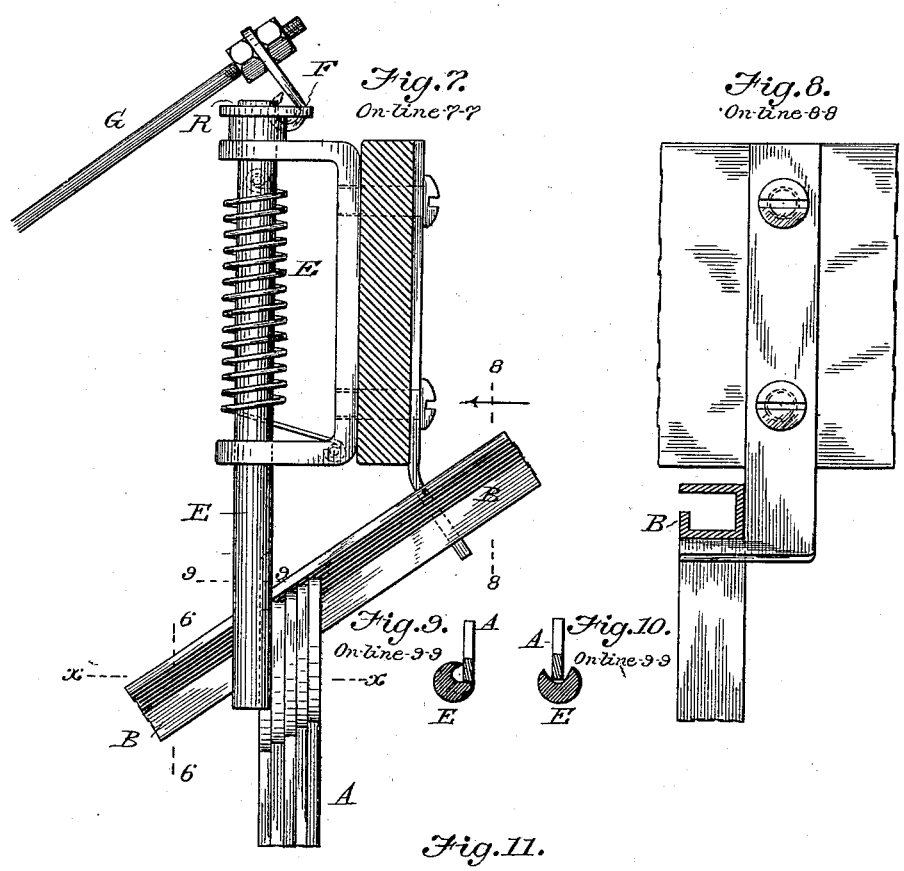
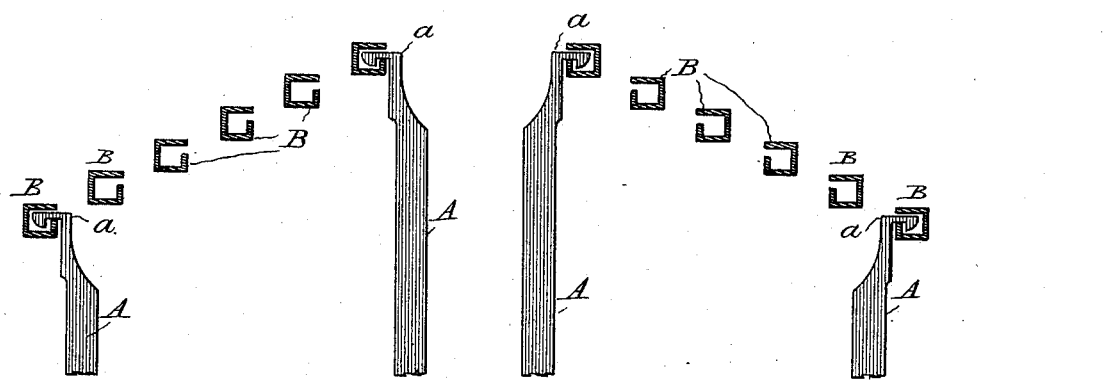
WITNESSES:
J. F. George
W. H. Gurler
INVENTOR
Jno. R. Rogers
BY
P. T. Dodge
ATTORNEY No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 8.
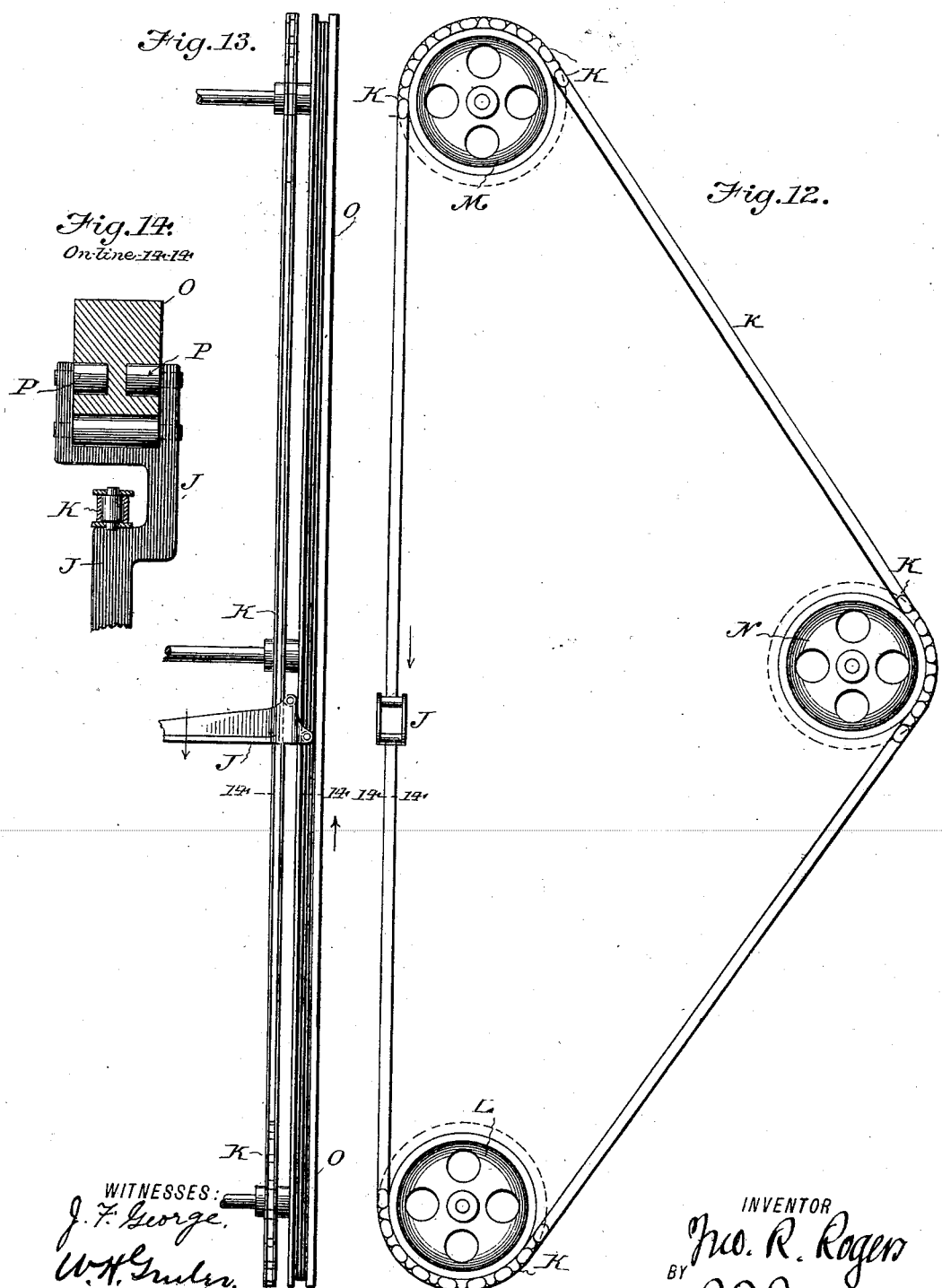

No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 9.
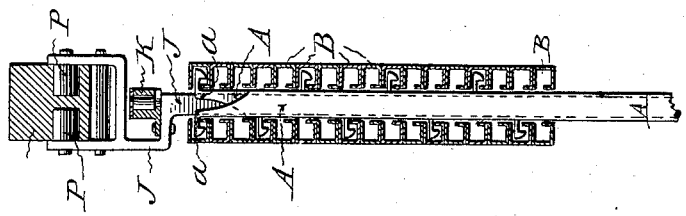
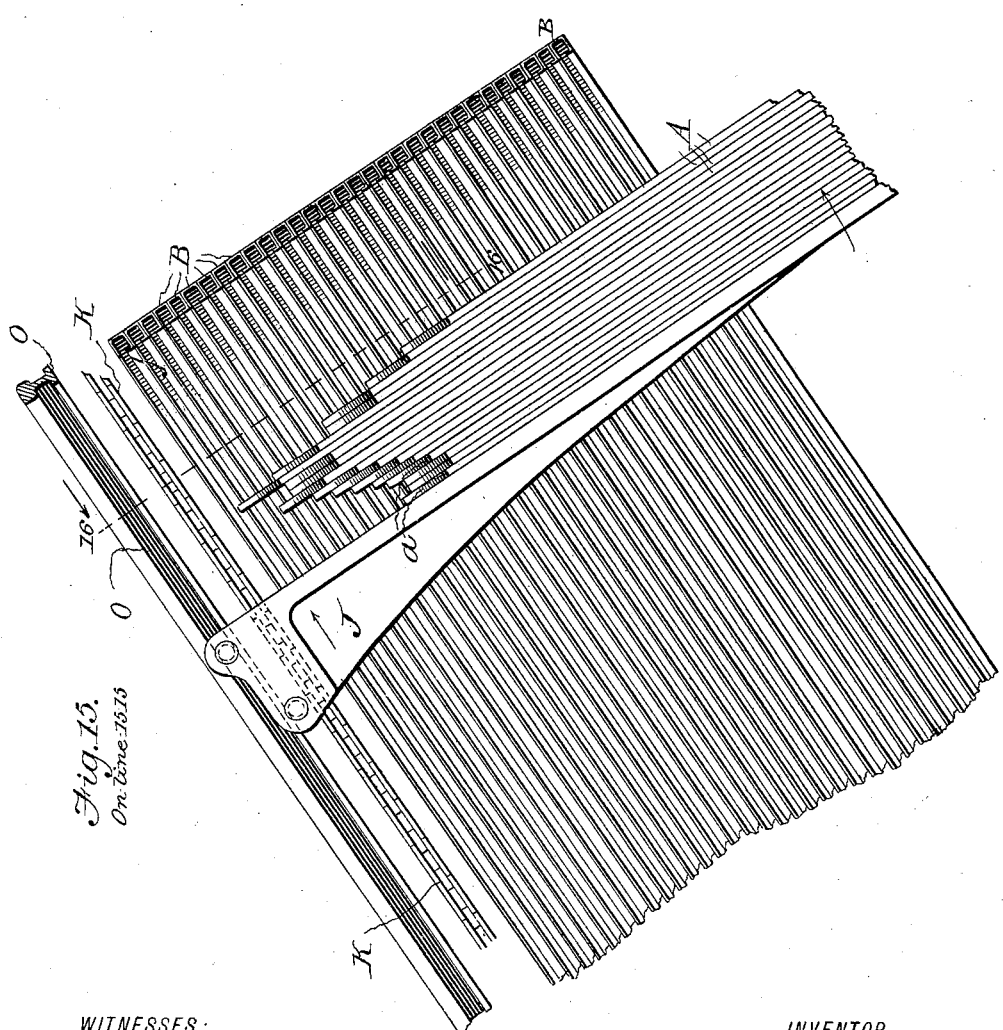
WITNESSES:
J. F. George
W. H. Truler
INVENTOR
Jno. R. Rogers
BY
P. T. Dodge
ATTORNEYS.

No. 630,412. Patented Aug. 8, 1899.
J. R. ROGERS.
MECHANISM FOR ASSEMBLING AND DISTRIBUTING TYPE DIES.
(Application filed Mar. 23, 1899.)
(No Model.) 10 Sheets—Sheet 10.
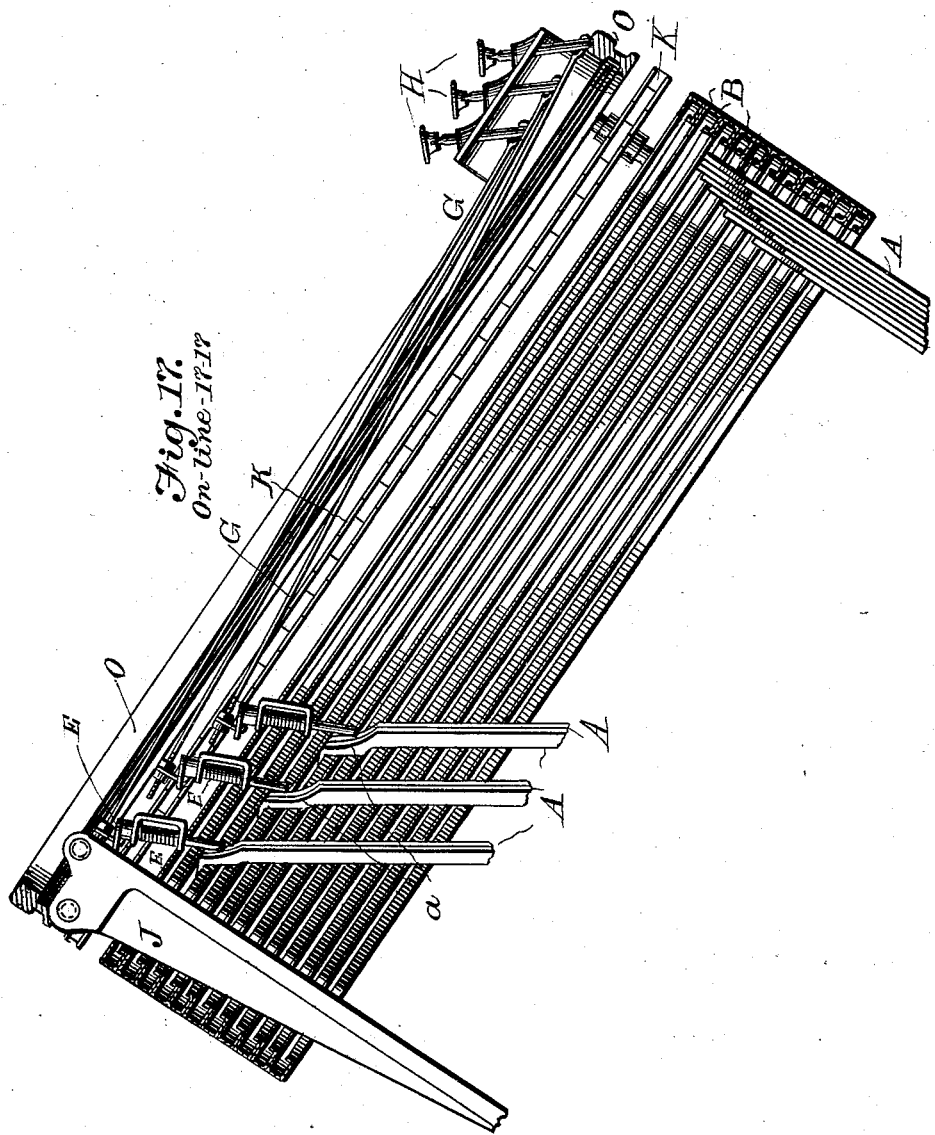
WITNESSES:
INVENTOR
ATTORNEY

UNITED STATES PATENT OFFICE.

JOHN R. ROGERS, OF NEW YORK, N. Y., ASSIGNOR TO THE MERGENTHALER LINOTYPE COMPANY, OF NEW YORK.

MECHANISM FOR ASSEMBLING AND DISTRIBUTING TYPE-DIES.

SPECIFICATION forming part of Letters Patent No. 630,412, dated August 8, 1899.

Application filed March 23, 1899. Serial No. 710,197. (No model.)

*To all whom it may concern:*

Be it known that I, JOHN R. ROGERS, a citizen of the United States, residing in New York, (Brooklyn,) in the county of Kings and State of New York, have invented a new and useful Improvement in Mechanism for Assembling and Distributing Type-Dies, of which the following is a specification.

There are now known in the art various machines in which a series of dies, each representing a letter or other character, are held in storage, finger-keys or equivalent devices being employed to select the dies and assemble them temporarily in justified lines, each line representing the characters for one line of print in the order and arrangement in which they are to appear. In one class of these machines the dies are of the female order, or, in other words, are matrices, and the composed line of dies is applied directly to close the face of a slotted mold, in which a type-metal slug is cast against the series of matrices or dies, which operate directly to produce the characters in relief on the slug, after which the dies are distributed to the magazine or place of storage, from which they are redelivered and assembled in new arrangements for successive lines of print. In another class of these machines, commonly known as "matrix-machines," dies of the male order are employed and the composed line of dies impressed into lead, papier-mâché, or equivalent material to form a matrix, which is used in connection with a mold to reproduce the characters in relief on the edge of a type-metal slug cast in the mold, the dies being thereafter distributed, preparatory to their selection and reassemblage in their order.

My invention is applicable alike to machines of the two classes named.

The invention has to do solely with the means for assembling and distributing the dies, without reference to the casting or indenting mechanisms which are to coöperate with the dies.

The invention may be considered more particularly as an improvement on a machine heretofore invented by me, commonly known in the market as the "Typograph" and represented in Letters Patent of the United States No. 557,232, dated March 31, 1896. In this machine the dies are in the form of slender rods having the characters at their lower ends and having their upper ends fashioned into hooks by which they are suspended from a series of wires or guides, each wire carrying dies bearing the same character. The wires bearing the groups of dies are widely separated at their upper ends, but extend downward in converging lines and finally terminate at their lower ends in two vertical tiers or rows, so that the dies when released will descend by gravity on the several wires and aline themselves side by side between the lower parallel ends of the wires. The distribution of the dies after use was effected by canting or tilting backward the frame in which the wires were supported, thereby reversing their inclination, so that the dies would run back on their respective wires, separating from each other, to the storage-point from which they were released.

The primary object of the present invention is to overcome the delays and objections incident to the old mode of distribution and to provide a machine in which the dies shall be carried by endless guides or ways, so that they may travel around always in one direction, thus allowing each die, while remaining perpetually in engagement with its guide or way, to travel from the storage-point to the assemblage-point, and thence backward through a continuing path to the point from which it started. To this end I provide a number of endless guides equal in number to the characters represented in the machine and each intended to sustain a group of pendent dies bearing the same letter or character. Midway of their length, at the points where the dies are held at rest thereon by escapement devices connected with finger-keys, these guides are spread or separated horizontally in order to permit the groups of dies to hang between them. From this point they are carried downward in converging lines until they finally terminate in parallel portions overlying each other in two vertical tiers, so that the dies may be assembled in line between them, as in my previous machine. At this point, however, the resemblance to the original machine ceases, and I now continue the guides to one side, and thence upward and rearward in two parallel tiers, so that the dies without disengagement may be moved backward and upward between them to the rear end of the machine. From the rear upper portion of the machine the guides are continued downward in diverging lines to the points at which the dies are held in storage, this divergence being for the purpose of separating or distributing the dies, which join their respective groups at the rear. This arrangement of continuous guides converging from the middle toward the front for purposes of assemblage or composition and diverging from the rear toward the middle for purposes of distribution enables me to construct a very simple machine in which the assemblage or composition of one line of dies may be carried on concurrently with the distribution of the dies forming the preceding line. I prefer to use as guides tubes of rectangular form having in one side a slot through which suitably-formed hooks on the upper ends of the dies will be engaged, but the sectional form of these guides is not of the essence of my invention.

For the purpose of carrying the line of dies from the point of assemblage upward to the point where distribution occurs I propose to use an endless chain suitably guided and carrying a finger which sweeps the dies before it; but any equivalent carrier may be employed.

In the accompanying drawings I have represented such parts only as are necessary to an understanding of my invention.

Figure 2:
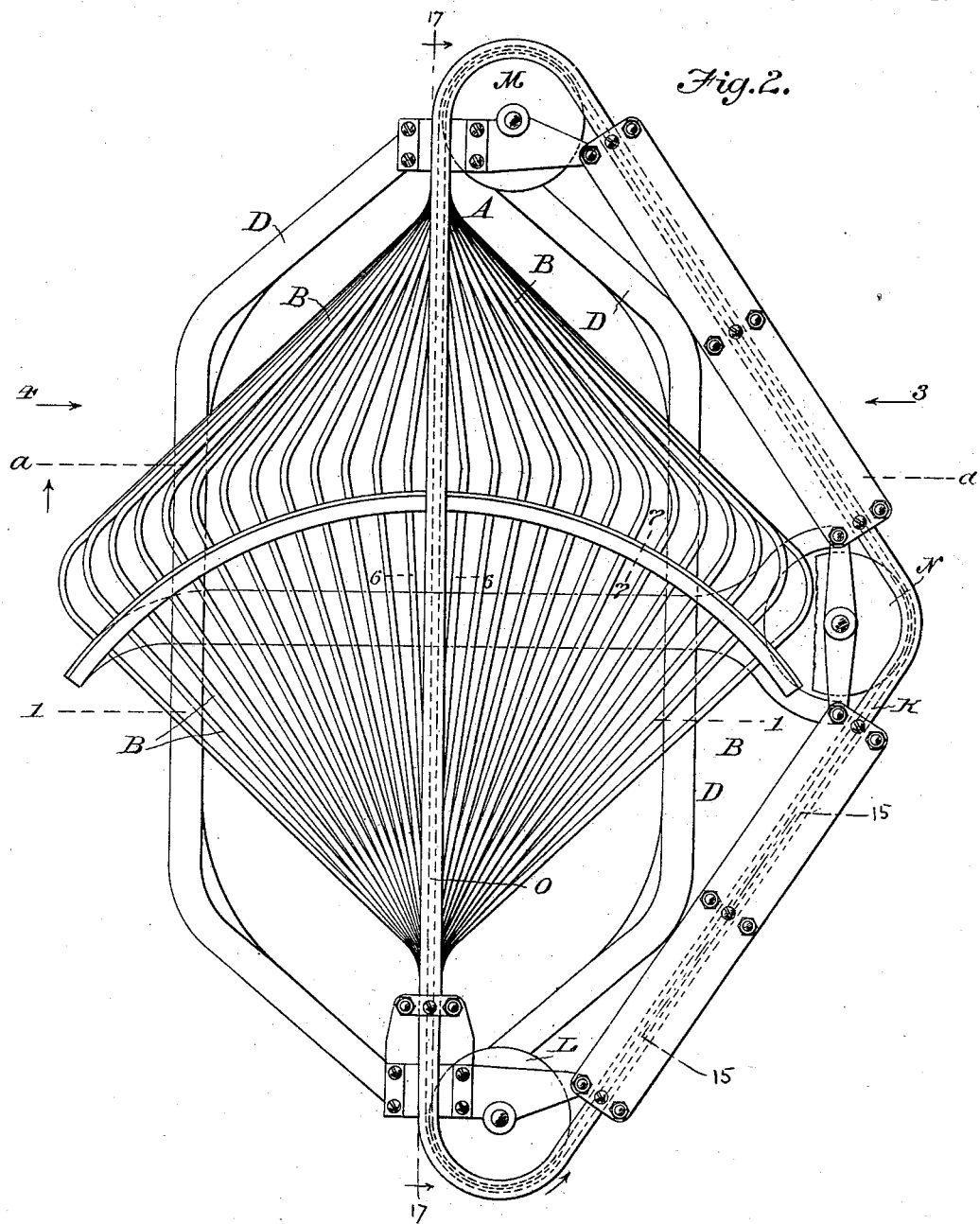

Figure 1 is a front elevation of my mechanism, a number of the finger-keys and the escapements connected therewith being omitted in order to expose others to view. Fig. 2 is a plan view looking down obliquely on the top of the machine with the keyboard omitted to expose other parts to view. Fig. 3 is a side view of the machine looking from the right, as indicated by the arrow 3 in Figs. 1 and 2. Fig. 4 is a similar view looking from the left side of the machine, as indicated by the arrow 4 in Figs. 1 and 2. Fig. 5 is a top plan view looking downward from the line 5 5, Figs. 3 and 4, of two of the complementary guides, one on the right and the other on the left, showing the manner in which they are extended rearward in parallel lines in order to guide the dies between them toward the point of distribution, the dies traveling always in the direction indicated by the arrows thereon. Fig. 6 is a vertical cross-section on the correspondingly-numbered line of Figs. 1, 2, and 7, showing more particularly the manner in which the guides diverge and converge and the relation of the escapements or die-releasing devices thereto. Fig. 7 is a vertical cross-section on the correspondingly-numbered line of Figs. 1, 2, and 6, showing on an enlarged scale one of the escapements for releasing the dies one at a time. Fig. 8 is a cross-section on the correspondingly-numbered line of the preceding figure, showing the manner in which the ways or guides are sustained. Figs. 9 and 10 are cross-sections on the line 9 9 of Figs. 6 and 7, illustrating the manner in which the dies are held by the escapement and released by its rotation. Fig. 11 is a vertical cross-section through a number of the guides or ways, showing their arrangement at different levels between the storage-point and the assembling-point. Fig. 12 is a top plan view showing the distributer-chain, its finger, and the guides around which it travels. Fig. 13 is a side view of the same, together with the guide-rail for the finger, and Fig. 14 is a cross-section on the correspondingly-numbered line of the two preceding figures. Fig. 15 is a vertical longitudinal section on the correspondingly-numbered line of Figs. 1, 2, and 5, between the rearwardly-extending portions of the two series of guides, showing the manner in which the dies are carried rearward and upward between them by the distributing-finger. Fig. 16 is a vertical cross-section on the correspondingly-numbered line of Fig. 15, illustrating the manner in which the dies are suspended between the two tiers or series of rearwardly-extending guides in their course toward the point of distribution. Fig. 17 is a longitudinal vertical section on the line 17 17, Fig. 1, looking toward the right.

As the first step in the construction of my machine I provide a series of dies A A, (see Figs. 6, 11, 15, 16, &c.,) each consisting of a shank or stem having a character or letter in or upon its lower end, as heretofore, and having at the upper end a laterally-extending hook or shank $a$ to engage with the supporting-guides. As in my previous machines, the dies bearing different characters will be made of different lengths, so that although suspended from guides at different heights or levels their lower ends will aline at a common level.

As the second step in the construction of the machine I provide the series of endless guides B, such as shown in Figs. 5, 6, 7, 8, 11, &c., equal in number to the keys in the keyboard. In the preferred form these guides consist each of a square tube of brass, steel, or other suitable material, having a slot or opening cut in one of its vertical sides to admit the shank of a die, so that the latter may hang suspended therefrom. Each guide is made in one continuous or unbroken length and the slot extended throughout its length, so that the suspended dies may travel around and around in one direction the entire length of the guide. I mount these guides rigidly in a framework C, which may be of any suitable form and construction adapted to sustain them. All of the guides are inclined downward from the rear of the machine toward the front, so that the dies tend when released to descend by gravity to the front. In the body of a machine the guides are arranged, as shown in Fig. 5, to converge downward and upward from a point midway of their length, where the groups of dies are ordinarily held at rest and which I therefore term the "storage-point." The guides are deflected to the right and left of the central line in pairs, as shown in Fig. 5, in order to leave between them an open space in which the dies hang suspended. Beginning at the middle of the machine the guides to the right and left stand at successively lower levels at the storage-point, (shown by cross-section in Figs. 6 and 11,) and this in order that the dies on the successive guides may hang freely from the guides without interference with each other. From the storage-point the guides, extending downward and forward, converge toward the middle line, and at the lower ends they assume parallel positions, those on the right being brought together in a vertical tier one on top of another, while those on the left are arranged in like manner, thus leaving between the lower ends of the two series a vertical slot or space in which the dies are assembled, as indicated by dotted lines in Fig. 5. From this point the guides are carried to the right and then extended upward and rearward and again carried to the left until they reach the rear end of the machine, when they are returned in curved lines toward the front and then carried downward and forward in diverging lines to the storage-point or point of beginning.

It will be observed that the guides extending rearward from the point of assemblage are arranged in two vertical tiers, leaving between them a continuous vertical opening or slot, through which the composed line of dies may be conveniently guided and carried backward. This composed line may consist of dies some of which are suspended from the left-hand guides and others from the right-hand guides, as shown in Fig. 15; but this fact does not in the least interfere with their travel rearward and upward between the guides.

Adjacent to each guide at the storage-point I mount on the main frame an escapement device D, which may be of any form and construction adapted to release one die at a time in order that it may pass down the guide to the assemblage-point. In the form shown the escapement consists of a vertical spindle the lower end of which is grooved on one side, as shown in Figs. 7, 9, and 10, so that when it is given a rotary oscillation it will receive the upper end of the forward die in the group on the guide, as shown in Fig. 10, and carry the same forward, allowing it to pass freely down the guide, while holding the remainder of the group in check. Each of these escapements is surrounded, as shown in Fig. 7, by a helical spring E, which tends to hold it in its normal position of rest. At the upper end the escapement is provided with a crank-arm F, from which a wire G is extended to the keyboard and there connected to a finger-key H, as shown in Fig. 1. There is an escapement and finger-key connection for each of the guides. In composing a line the keys representing the desired characters are operated in proper sequence. Each key actuates the corresponding escapement, thereby allowing the die bearing the selected character to descend its guide to the assemblage-point. In this way the line is composed, essentially as in my earlier machine, between the lower ends of the guides.

In order to effect the distribution of the line of dies, it must be carried bodily upward along the rearwardly-extending portion of the guides until it reaches the rear end of the machine, from which point the dies will descend by gravity down the diverging guides to the rear ends of the groups thereon at the place of storage. For the purpose of thus transferring the line I make use of a distributing-finger J, (see Figs. 12, 13, 14, 15, and 16,) carried by an endless chain K, which is extended around the three guide-wheels L, M, and N, suitably mounted in the frame. These wheels are located, it will be observed, at the front and rear ends of the machine and at the extreme right midway of its length, so that the chain is caused to carry the finger downward along the center line of the machine between the right and left guides and against the rear end of the composed line and thence downward, upward to the right between the parallel guides until the rear end of the machine is reached. As an additional means of guiding the finger I propose to fix rigidly to the frame an endless guide-rail O, (see Figs. 1, 2, 13, 14, 15, and 16,) overlying the chain and grooved in its side to receive antifriction-rollers P on the upper forked end of the finger which straddles the rail, as shown in the several figures. It will be observed that in this manner the distributer-finger is caused to pursue a circulatory course, traveling centrally to the front through the machine, behind the composed line, and then sweeping the line rearward and upward before it, and finally advancing again centrally behind the next line. It will be observed that the divergence of the guides from the rear end forward carries the dies to the right and left out of the path of the finger, which will be held at rest until the next line is composed before it on the lower ends of the guides.

The essence of the invention lies in the continuity of the guides carrying the dies, so that they may pursue a circulatory course through the machine, each die pursuing one path from the storage-point to the point of assemblage and a different path in its return to the point of storage.

My invention includes guides of any form in cross-section adapted to sustain the dies and arranged in any relation to each other, provided they converge to one point for purposes of assemblage and diverge from another point for purposes of distribution.

While the number of characters employed in the machine is usually so great as to demand the use of two series of guides diverging to the right and left of the median line, it is evident that in machines containing only a small number of guides they may all diverge to one side of said line. While I have shown in the drawings the two series of guides returned rearward on one side of the machine in parallel lines, it is manifest that the guides on each side may be carried rearward on the same side and independently of those on the opposite side, as indicated by dotted lines in Fig. 5, but this arrangement is not recommended, as it necessitates the employment of two distributer fingers or carriers.
While I prefer to make use of an endless chain and finger as a means of transferring the dies to the rear, it is to be understood that any other device which will cause the proper travel of the dies along the guides is to be considered the mechanical equivalent of the construction shown.

The word "dies" is used herein in a generic sense as including both cameo and intaglio dies.
While it is preferred, because of the simplicity and cheapness resulting therefrom, to arrange the guides in an inclined position so that the dies will descend by gravity during the distribution and composition, it is manifest that many of the advantages attending the use of the continuous or endless guides can be retained when the guides are arranged in a horizontal position. In such case, however, it will of course be necessary to provide means for advancing the dies along the guides during the course of composition and distribution.

By the expression "continuous guide" as herein employed is meant a guide over which the dies may travel from any given point in one direction, being returned to said point without the interposition of intermediate supports or carriers.

It is evident that the mere division of the guides at any point in their length, although the two ends may be thrown slightly out of line, will not be a departure from my invention or an avoidance of the claims herein, providing the construction is such that the dies in their course may pass across the point of division from one end of the guide to the other.

Having thus described my invention, what I claim is—

1. In a mechanism for assembling and distributing type-dies, an endless guide and dies sustained thereby and arranged to travel thereon.

2. In a mechanism for assembling and distributing type-dies, a series of endless guides or ways on which the dies are stored and around which they travel for assemblage and distribution, substantially as described and shown.

3. In a mechanism for assembling and distributing dies, a series of endless die-sustaining guides diverging through a portion of their length to effect the distribution of the dies and converging through another portion of their length to assemble the dies in line.

4. A series of endless inclined die-sustaining guides converging in opposite directions from the storage-point in combination with escapement devices to release the dies one at a time, for assemblage in a common line, and means for advancing the assembled line upward along the guides, preparatory to their distribution thereby.

5. A series of endless inclined guides separated in oblique lines through a portion of their length and brought together in parallel lines for the remainder of their length in combination with dies suspended therefrom and arranged to slide downward to an assembling-point by gravity, escapements to hold the dies at rest and release them one at a time for assemblage, and means for continuing the movement from the assembling-point along the guides to their upper ends.

6. A series of inclined die-sustaining guides diverging laterally from their upper ends to distribute the dies, converging again toward their lower ends to aline the released dies and continued upward at one side to the point of beginning: whereby the guides are adapted to assemble the different dies in a common line, carry the assembled line to the rear, and then distribute the dies on their respective guides to the storage-points from which they started.

7. A series of endless guides and type-dies arranged to travel thereon always in the same direction, said guides converging at one point to assemble their dies in line and diverging at another point to distribute or separate the alined dies.

8. The inclined endless guides converging and diverging for a portion of their length and parallel for the remainder of their length in combination with type-dies suspended therefrom, and a carrier to advance the dies along the guides from the place of convergence to the place of divergence.

9. In a mechanism for assembling and distributing type-dies, the endless guides inclined downward and forward in diverging and converging lines, and then rearward and upward in two vertical tiers in combination with the type-dies suspended therefrom, escapements to control the descent of the dies, and a carrier-finger arranged to advance behind the assembled line and carry the same upward between the tiers of guides.

10. In combination with the inclined endless guides and dies thereon escapements to control the advance of the dies, an endless chain provided with a carrier-finger, substantially as described and shown.

11. The endless guides, the dies thereon, the escapements, the endless chain, its finger and the guide-rail for the finger, constructed and combined, substantially as shown.

12. In a mechanism for assembling and distributing type-dies, a guide consisting of a longitudinally-slotted tube in combination with a die having a shank or head to enter the slot and engage within the tube.

13. In a mechanism for assembling and distributing type-dies, a series of fixed guides arranged in a vertical tier, each guide consisting of a rectangular tube longitudinally slotted in one side to receive the shank of the die.

In testimony whereof I hereunto set my hand, this 21st day of March, 1899, in the presence of two attesting witnesses.

JOHN R. ROGERS.

In presence of—
M. E. RESEK,
A. M. BERRY.